Patented Dec. 15, 1942

2,305,511

UNITED STATES PATENT OFFICE 2,305,511

LACQUER SOLVENT AND COMPOSITION

Franklin A. Bent and Frederick B. Hilmer, Berkeley, Calif., assignors to Shell Development Company, San Francisco, Calif., a corporation of Delaware No Drawing. Application January 26, 1940, Serial No. 315,852

5 Claims. (Cl. 106—187)

This invention relates to new solvent compositions, and mixtures containing them, which may be used in coating compositions, or in thinners therefor. More particularly, it relates to new and improved solvent compositions which may be used as substitutes for such standard lacquer and varnish solvents as n-butyl acetate and sec-amyl acetate.

An object of this invention is to provide novel solvent compositions which may serve as satisfactory substitutes for those solvents generally employed in lacquers and coating compositions, and at the same time be lower in cost as well as equal or superior in general solvent properties.

Methyl isobutyl ketone has been used as a lacquer solvent, but, as compared to commonly used solvents, such as normal butyl acetate, it has some quite disadvantageous characteristics. For example, it has an evaporation rate which is greater than is desirable to permit good leveling-out of the lacquer film, and its dilution ratio against aliphatic hydrocarbons is too low. Attempts have been made to slow the evaporation rate of methyl isobutyl ketone in lacquers containing it by blending therewith slower-evaporating solvents. While it has by these means been possible to obtain methyl isobutyl ketone-containing solvent blends of lower evaporation rate, the resulting blends are nevertheless unsatisfactory in that their dilution ratio against all hydrocarbon diluents, aliphatic as well as aromatic, is prohibitively low, being materially lower than that of normal butyl acetate and methyl isobutyl ketone alone.

We have found that blends of methyl isobutyl ketone and methyl isobutyl carbinol in certain general proportions are free of the defects, such as low dilution ratio, inherent in known methyl isobutyl ketone-containing blends, and which exhibit properties which allow them to be used as substitutes for normal butyl acetate and/or secondary amyl acetate in surface coating compositions, such as lacquers and the like, without necessarily changing the material balance of the formulae of these compositions. Such compositions containing the substitute mixture of methyl isobutyl ketone and methyl isobutyl carbinol have been found to be at least equal and in many cases superior in application, yielding a coating highly resistant to blushing, which on drying will be strongly adherent, of high gloss, resilient, and free of "crows' feet" and "orange peel" defects.

The new solvent mixtures possess a solvent power for cellulose derivatives, natural and synthetic resins and gums, rate of evaporation, blush resistance, dilution ratio, as well as non-toxicity and odor which compare favorably to the like properties and characteristics of normal butyl acetate and the other standard solvents. When the mixtures are employed in pigmented lacquer compositions, the pigments normally used in such compositions remain in suspension for the requisite period of time to permit the application of satisfactory films. In those formulae for lacquers and cellulose derivative compositions which stipulate the use of normal butyl acetate or secondary amyl acetate or other standard lacquer solvents, the solvent mixtures herein disclosed and described may for all practical purposes be substituted with advantage.

The new solvent mixtures may be made up with methyl isobutyl ketone and methyl isobutyl carbinol of technical or more refined grades. In the production of methyl isobutyl ketone by the hydrogenation of mesityl oxide a minor amount of methyl isobutyl carbinol is obtained in the product. By regulating the conditions of the hydrogenation, varying amounts of methyl isobutyl carbinol may be produced concurrently with the methyl isobutyl ketone. The mixture derived from this simultaneous production is satisfactory for use as a solvent or thinner, and because of the simplicity of its manufacture is a low cost substitute.

Depending upon the purposes for which the coating composition is intended and the climatic conditions under which it will be used, various proportions of methyl isobutyl ketone and methyl isobutyl carbinol may be used in the solvent portion. In general, we prefer to use mixtures of methyl isobutyl ketone and methyl isobutyl carbinol containing the former in predominating amount by volume. Excellent results have been obtained with such mixtures which contain from about 70% to 95% by volume of methyl ketone and about 5% to 30% of methyl isobutyl carbinol, that is, wherein the volume ratio of the methyl isobutyl ketone to methyl isobutyl carbinol is about 2.3–19.0 to 1. A preferred mixture for cellulose derivative coating compositions consists of about 15 volume percent of methyl isobutyl carbinol and about 85 volume percent of methyl isobutyl ketone. While experiments indicate that the particular mixtures indicated as proposed are excellent for most purposes, it should be considered that the solvent blend composition desirable for one type of application may not always be so for another. Climatic conditions vary considerably, and the qualities desired by one user may be quite different from those needed by another. Under the various circumstances, the flexibility in the composition of the solvents of the present invention may be utilized to compensate for the variations in the use of the product and the particular characteristics desired therein.

This invention relates in general to lacquer solvents, thinners, mixtures thereof, and coating compositions containing the same. The solid content of the coating compositions may be natural and/or synthetic resins and gums, plasticizers, cellulose derivatives as cellulose esters, cellulose ethers, cellulose ether-esters, nitrocellulose, etc. The solvent blends of the invention are particularly useful as components of nitrocellulose lacquers, and as solvents and thinners therefor.

The solvency of nitrocellulose in a solvent is usually measured by the tolerance of the solution to dilution with a non-solvent. A solution of nitrocellulose will tolerate the addition of a certain amount of non-solvent, after which further addition causes precipitation of the nitrocellulose. This limit of tolerance is generally referred to as the "dilution ratio" and is numerically expressed by the quotient of the volume of non-solvent used divided by the volume of sample taken. The dilution ratio of the methyl isobutyl ketone and methyl isobutyl carbinol mixture and other comparable solvents with respect to widely used lacquer diluents is listed in the following table:

*Dilution ratios at 8% final concentration of ½ second r. s. nitrocellulose*

| Solvent | Diluent | |
|---|---|---|
| | Toluene | Petroleum diluent (50% wt. aromatics) |
| A mixture of 82.6 volume percent of methyl isobutyl ketone and 17.4 volume percent methyl isobutyl carbinol | 3.90 | 2.13 |
| Methyl isobutyl ketone | 3.80 | 2.00 |
| Normal butyl acetate | 2.95 | 2.00 |
| Secondary butyl acetate | 2.63 | 1.80 |

From these figures it may be seen that the dilution ratio of the novel solvent compositions is greater than the dilution ratio of normal butyl acetate and of secondary butyl acetate.

The presence of resins in nitrocellulose coating compositions is to improve the gloss of the film after drying, and to increase the hardness and adhesion of the film to the surface to which the composition is applied. A partial list of the resins which the present solvent blends are capable of dissolving as efficaciously as normal butyl acetate includes natural dewaxed dammar, natural manila copal, sulfonamide formaldehyde and polystyrene chlorinated diphenyl.

The solvent mixtures of the invention are also satisfactorily compatible with the plasticizers commonly used in lacquers. The nature of the solvent portion of a lacquer affects the viscosity, or flowing property of the finished lacquer composition. This viscosity is generally regarded as being corollated with the solvent power of the solvent. Those solvents which give solutions of low viscosity as a rule are cheaper to use because the finished lacquer composition requires less thinner for a film coating of equal thickness.

When the solvent mixtures of the invention are employed in standard lacquer formulae, they display a substantially lowered viscosity. Accordingly, their use permits high solids content for certain types of lacquers, or the use of less thinner in the standard lacquers.

An important aspect of a solvent is its rate of evaporation, which has direct bearing upon the flow properties of the lacquer composition and the smoothness of the resulting film. Lacquers containing solvents of high volatility are apt to form films of an uneven surface, which are pitted, and which frequently have irregular color intensity. Solvents of low volatility sometimes cause films on setting to display a permanent gumminess. Normal butyl acetate has none of these defects as a solvent and produces smooth, uniform films. A general practice of the lacquer trade is to consider the rate of evaporation of other liquids in relation to normal butyl acetate. The ratio of the time of evaporation of a certain volume of a liquid under consideration to the time of evaporation of an equal volume of normal butyl acetate under like conditions is referred to as the relative rate of evaporation of the liquid.

On this basis, normal butyl acetate has a rate of evaporation of 1.00. Another commonly used solvent, secondary amyl acetate, has a relative rate of evaporation of 0.80. A mixture consisting of 17.4 volume percent methyl isobutyl carbinol and 82.6 volume percent methyl isobutyl ketone has a relative evaporation rate of 1.00. In the proposed composition range, the mixtures of methyl isobutyl ketone and methyl isobutyl carbinol have a relative rate of evaporation close to 1.00, thereby indicating the applicability of such mixtures as substitutes for normal butyl acetate and other known solvents of this type.

Lacquers having a low resistance to humidity may absorb water from the surrounding atmosphere thereby causing precipitation in the drying film of some or all of the dissolved solids. Such phenomena are termed by the general expression "blushing" though this term includes other clouding effects that may appear in or on the drying film. A mixture of 82.6 volume per cent methyl isobutyl ketone and 17.4 volume percent methyl isobutyl carbinol was used as the solvent for an 8% one half second nitrocellulose lacquer. This test lacquer together with another lacquer containing normal butyl acetate as the solvent were applied to glass panels, which were subjected to moving air of 85% relative humidity at 80° F. The film resulting from the lacquer containing the methyl isobutyl ketone-methyl isobutyl carbinol was clear, showed no blush and displayed even better resistance to "blushing" than the lacquer blend containing normal butyl acetate.

As typical examples of lacquers, their solvents, and lacquer thinners which may be prepared employing the solvent blends of the invention, the following are cited for purposes of illustration only:

*A wood lacquer*

| | |
|---|---|
| 5 lbs. ½ second nitrocellulose | Dissolved in 6 gals. of the following solvent: |
| 2 lbs. 6 second nitrocellulose | 25 vol. % of a blend of methyl isobutyl ketone and methyl isobutyl carbinol containing about 83% by volume of the former and about 17% by volume of the latter. |
| 7 lbs. dewaxed dammar | 15 vol. % methyl ethyl ketone. |
| 4 lbs. ester gum | 10 vol. % isopropyl alcohol. |
| 2 lbs. dibutyl phthalate | 10 vol. % normal butyl alcohol. |
| 3 lbs. blown castor oil | 10 vol. % toluol. |
| 2 oz. urea | 30 vol. % petroleum spirits. |

Spray lacquer thinner

| | Volume (percent) |
|---|---|
| A blend of methyl isobutyl ketone and methyl isobutyl carbinol containing about 83% by volume of the former and about 17% by volume of the latter | 25 |
| Methyl ethyl ketone | 15 |
| Secondary butyl alcohol | 10 |
| Isopropyl alcohol | 5 |
| Aliphatic petroleum diluent | 45 |

It is to be understood that, in the specific examples cited and in the body of the specification, the proportions of the various materials and substances may be varied in accordance with their intended uses and applications, and that the scope of this invention is to be regarded as limited only by the accompanying claims, in which it is our intention to claim all novelty inherent therein as broadly as is possible in view of the prior art.

We claim as our invention:

1. A composition of matter comprising nitrocellulose dissolved in a solvent containing methyl isobutyl ketone and methyl isobutyl carbinol in the volume ratio of about 5.7 volumes of methyl isobutyl ketone to 1 volume of methyl isobutyl carbinol.

2. A composition of matter comprising nitrocellulose dissolved in a solvent containing methyl isobutyl ketone and methyl isobutyl carbinol in the volume ratio of from about 2.3 to 19 volumes of methyl isobutyl ketone to 1 volume of methyl isobutyl carbinol.

3. A composition of matter comprising a cellulose ester which is soluble in organic solvents dissolved in a solvent containing methyl isobutyl ketone and methyl isobutyl carbinol in the volume ratio of about 5.7 volumes of methyl isobutyl ketone to 1 volume of methyl isobutyl carbinol.

4. A composition of matter comprising a cellulose ester which is soluble in organic solvents dissolved in a solvent containing methyl isobutyl ketone and methyl isobutyl carbinol in the volume ratio of from about 2.3 to 19 volumes of methyl isobutyl ketone to 1 volume of methyl isobutyl carbinol.

5. A composition of matter comprising a film-forming material of the group consisting of the cellulose ethers and cellulose esters which are soluble in organic solvents dissolved in a solvent containing methyl isobutyl ketone and methyl isobutyl carbinol in the volume ratio of from about 2.3 to 19 volumes of methyl isobutyl ketone to 1 volume of methyl isobutyl carbinol.

FRANKLIN A. BENT.
FREDERICK B. HILMER.